(12) United States Patent
Agarwala et al.

(10) Patent No.: US 6,667,262 B2
(45) Date of Patent: Dec. 23, 2003

(54) SELF-LUBRICATING CERAMIC COMPOSITES

(75) Inventors: Vinod S. Agarwala, Lexington Park, MD (US); Alfeo A. Conte, Jr., Warington, PA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 19 days.

(21) Appl. No.: 09/954,283

(22) Filed: Sep. 7, 2001

(65) Prior Publication Data

US 2003/0050178 A1 Mar. 13, 2003

(51) Int. Cl.$^7$ .................... C04B 35/58; C10M 103/06
(52) U.S. Cl. .................. 501/96.3; 501/92; 501/103; 501/124; 501/128; 501/97.4; 508/107; 508/108; 508/165; 106/692
(58) Field of Search .............. 501/96.3, 92, 103, 501/104, 105, 128, 97.4, 124; 508/107, 108, 165; 106/692

(56) References Cited

U.S. PATENT DOCUMENTS

| 4,828,728 A | * | 5/1989 | Dimigen et al. ............ 508/107 |
| 5,422,321 A | | 6/1995 | Whalen et al. ............... 501/89 |
| 5,585,313 A | | 12/1996 | Shobu et al. ................. 501/89 |
| 5,792,717 A | * | 8/1998 | Takayama ................... 508/107 |
| 5,851,675 A | * | 12/1998 | Oyagi et al. ................ 428/426 |
| 5,932,506 A | | 8/1999 | Bogan ......................... 501/89 |
| 5,998,318 A | | 12/1999 | Takanami .................... 501/90 |
| 6,077,815 A | * | 6/2000 | Grunthaler et al. ......... 508/108 |

FOREIGN PATENT DOCUMENTS

JP           10-231174         *  9/1998

* cited by examiner

*Primary Examiner*—Karl Group
(74) *Attorney, Agent, or Firm*—Ron Billi

(57) ABSTRACT

The invention comprises a self-lubricating ceramic composite characterized as having a low porosity derived from a mixture of at least one ceramic powder preferably selected from the group consisting of silicon nitride, silicon carbide, zirconia, alumina, zirconium nitride, tungsten carbide, and titanium carbide; a cemetitious binder, effective amounts of at least one metal silicide, and at least one metal oxide. The ceramic powder mixture can be slurried with sufficient amounts of water and subsequently subjected to pressures of about 6.0 to 7.0 MPa in a mold at temperatures of about 125° to 175° C. to form a self-lubricating ceramic composite capable of maintaining hot-hardness temperatures above 750° C. These self-lubricating ceramic composites are particularly useful in the manufacture of high-performance turbine engines, including engine parts, bearings, gears, rotors and in other areas where high-heat lubricating properties of the ceramic composite are required.

17 Claims, 3 Drawing Sheets

SELF-LUBRICATING CERAMIC COMPOSITES

ORIGIN OF INVENTION

The invention described herein was made by an employee of the United States Government and may be manufactured and used by or for the Government for governmental purposes without the payment of any royalties thereon or therefor.

BACKGROUND OF INVENTION

1. Field of the Invention

The present invention relates to ceramic composites with high-heat resistant properties for use where high-heat resistant properties are required, and in particular to the process of preparing ceramic composites with high-heat resistant properties, resistance to oxidation and excellent strength under increased temperatures. More specifically, the present invention relates to a process of preparing castable self-lubricating ceramic composites of low porosity cable of maintaining hot-hardness temperatures in excess of 750° C.

The composites derived from this process comprise a combination of ceramic powders, cemetitious binders, and solid lubricants e.g. $MoSi_2$ and CdO which are particularly useful in manufacturing high-performance turbine engines including various engine parts such as bearings, gears, rotors and the like.

2. Background of the Invention

Ceramic composites are useful in diverse applications such as engine components, cutting tools and various wear resistant parts. Ceramic composites are known to have improved fracture toughness and improved wear properties. Conventional ceramics are generally monolithic materials which have low fracture toughness. This makes these ceramics brittle and they are liable to crack under stressed conditions, and therefore are not very useful for diverse industrial or military applications.

In general, however, ceramics have excellent heat resistance, oxidation resistance and corrosion resistance characteristics and are desirable as structural materials. Among the ceramics, silicon carbide (SiC) and silicon nitride ($Si_3N_4$) particularly are excellent as heat resistance and oxidation resistance materials and are very desirable as structural materials capable of being used at high temperatures. However, SiC and $Si_3N_4$ are materials that are difficult to provide in a dense sintered form without adding assistants. For example, $Al_2O_3$ is added as a sintering aid to SiC powder or to $Si_3N_4$ powder. Thus, there has been extensive research to produce hot-hardness ceramic composites of higher fracture toughness using silicon nitride or silicon carbide reinforced by other materials such as alumina, tungsten carbide, titanium carbide and the like.

There is a program which has a goal to construct an advanced engine. This engine should have a 20:1 thrust-to-weight ratio representing a 100% increase and a 50% decrease in fuel consumption over the state-of-the-art propulsion systems. The payoffs on attaining this goal are sustained mach 3+ capability and a 100% increase in range, loiter and payload. One of the limiting materials technology that currently exists in achieving these capabilities centers on providing lubrication to bearing surfaces. Tribomaterials, i.e. bearings, gears, rotors, and the like are required to operate at temperatures as high as 750° C. for the life of the system. There currently exists a major technology gap in materials and lubricants capable of functioning as friction couples at these extremely high temperatures, which if not bridged, will severely limit the successful achievement of this goal.

As propulsion system temperatures increase, a greater demand is placed on lubricant-bearing systems in moving mechanical assemblies such as bearings, gears and rotors. At elevated temperatures, liquid and grease lubricants evaporate, thermally decompose and oxidize. Currently available solid film lubricants are limited also to 650° C. and are short-lived, requiring constant replenishment. Currently used M-50 metallic bearings soften at 320° C. and thus cannot support load. Therefore, the need for the development of advanced materials technology to eliminate these shortcomings is readily apparent.

SUMMARY OF THE INVENTION

In accordance with the present invention, a primary purpose is to advance the state-of-the-art of lubricating ceramic materials for moving components under load such as bearings, and to provide a chemical system which contributes to enhancement of lubrication at ambient and elevated temperatures.

More specifically, this invention relates to a process and to the products derived therefrom which comprises a self-lubricating ceramic composite of low porosity comprising a mixture of:

(a) about 50 to 80 parts by weight of at least one ceramic powder having a particular size of less than 5.0 microns and preferably selected from the group consisting of silicon nitride, silicon carbide, zirconia (zirconium oxide), alumina (aluminum oxide), zirconium nitride, tungsten carbide, and titanium carbide, (b) about 0.1 to 10 parts by weight of a cementitious binder such as hydraulic cement (calcium aluminate), (c) about 0.1 to 10 parts by weight of at least one metal silicide such as $MoSi_2$, (d) about 0.5 to 10 parts by weight of at least one metal oxide such as CdO, and from (e) about 0 to 30 parts by weight of water. Either a dry mixture or a water slurry of the ceramic powders are subsequently subjected to pressures of about 6.0 to 7.0 MPa at temperatures ranging from about 125° to 175° to form self-lubricating ceramic composites capable of maintaining hot-hardness temperatures above 750° C.

It is therefore an object of this invention to provide a process of preparing self-lubricating ceramic composites of low porosity capable of maintaining a hot-hardness at temperatures greater than 750° C.

It is another object of this invention to provide a process of preparing self-lubricating ceramic composites of low porosity from a slurry of castable, cementitious ceramic powders.

It is further an object of this invention to provide self-lubricating ceramic composites of low porosity from castable cementitious ceramics capable of being formed into rigid structures by using known casting techniques.

The foregoing and additional objects associated with this invention will become more apparent from the detailed description, and with reference to the drawings; wherein like elements are designated by like reference numerals.

DETAILED DESCRIPTION OF THE INVENTION

Figure 1:
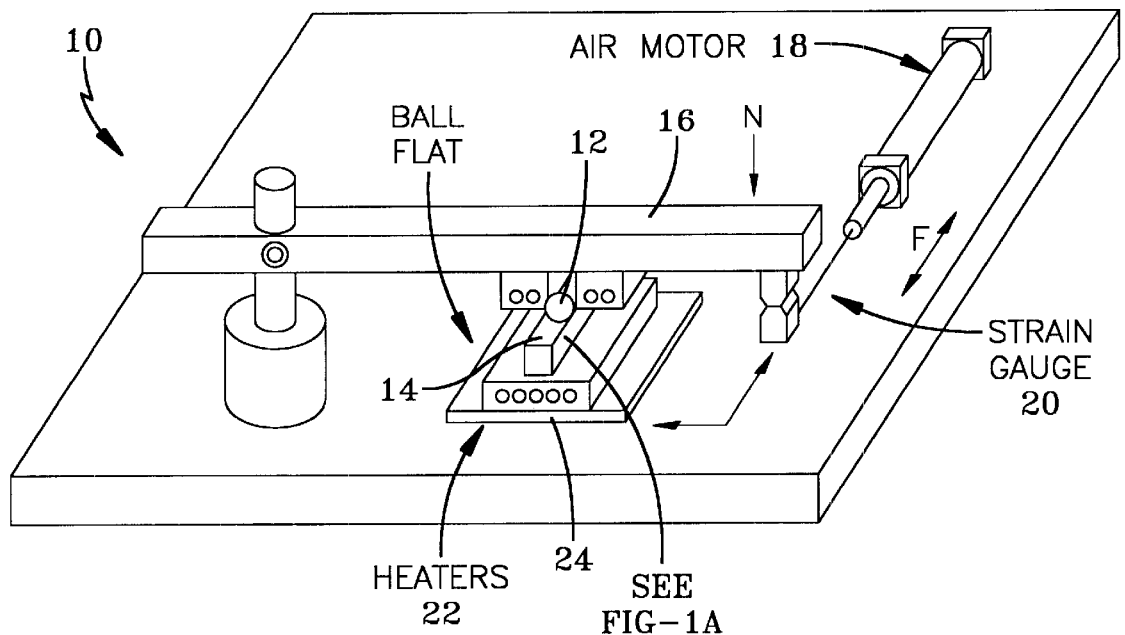
FIGS. 1 and 1A show a schematic diagram of the friction and wear test apparatus employed to study the unique properties of this invention.

Ceramic composites comprising various ceramic powders and particularly silicon nitride, silicon carbide, zirconia, alumina and the like are being proposed as advanced bearing materials for propulsion systems. The primary reason for their selection is based on the fact that they maintain their hot-hardness at temperatures greater than 750° C., and therefore can support heavy loads. Because of this property, many considered that ceramic materials would not require lubrication. However this is clearly not substantiated. For example, friction measurements as a function of load at three temperatures (23°, 450°, and 750° C.) for monolithic hot-isostatic pressed silicon nitride under non-lubricating conditions, demonstrates the need for lubrication. The coefficient of friction was found to be inordinately high, varying from 0.8 to 1.5 after initial run-in. Similar results were obtained with silicon carbide, silicon nitride, zirconia and alumina friction couples. Friction coefficients of less than 0.2 and preferably below 0.1 are essential if power loss requirements are to be minimized.

The lubed-for-life concept is based on the invention of ceramic hybrid composite materials, which incorporate an active lubricating agent, which can be fabricated, for example, into bearing structures. This self-lubricating structure acts as a bearing reservoir which supplies needed lubricant to sliding and rolling surfaces via a controlled transfer process, at temperatures beyond which current state-of-the-art lubricating materials and techniques are capable of providing.

In accordance with this invention, the approach used to prepare ceramic composite structures centered on taking advantage of the unique properties of ceramics. These ceramics have the ability to form rigid structures by utilizing known casting techniques and exposure to mild temperatures (100°–150° C.), thus greatly reducing processing time and eliminating sophisticated processing technology. The basis for these ceramic structures is the use of cementitious materials e.g. hydraulic cement i.e. calcium aluminate ($CaAl_2O_4$) which reacts with water to form a rigid high-temperature structure under mild processing conditions. Although initial composites were prepared as castings, their strength was severely lacking. This problem was eliminated, however, by the addition of metal silicides and metal oxides and by forming the composites at increase temperatures in a cylindrical mold under pressure at about 6.9 MPa to 7.0 MPa and higher.

The following examples illustrate the process and ceramic products obtained therefrom in accordance with this invention.

EXAMPLE 1

The process comprises intimately mixing about 70 to 80 parts by weight of zirconia ceramic powder and about 1 to 10 parts by weight of calcium aluminate binder together with effective amounts of additives (1.0–10 parts by weight of $MoSi_2$ and 0.5–10 parts by weight of CdO) to increase the strength and lower the coefficient of friction. This mixture was mixed in a roll-mill for 1 hour. To a ten gram portion of the intimately mixed ceramic powder, approximately 2 grams of water was added. The mixture was stirred until a consistent slurry was obtained, and then poured into a high pressure mold. A pressure of 6.9 MPa was applied as the mold was heated to 150° C. After 2 hours the specimen was released from the mold. This procedure and chemical system produced a ceramic structure of low porosity with self-lubricating properties.

EXAMPLE 2

Silicon carbide powder and calcium aluminate binder were mixed together with the appropriate amount of additives i.e. metal silicide and metal oxide to increase the strength and lower the coefficient of friction. The mixture was mixed in a roll-mill for 1 hour. To a ten gram portion of the intimately mixed ceramic powder, approximately 2 grams of water was added. The mixture was stirred until a consistent slurry was obtained, and then poured into a high pressure mold. A pressure of 6.9 MPa was applied as the mold was heated to about 150° C. After 2 hours the specimen was released from the mold. This procedure and chemical system produced a ceramic structure with self-lubricating properties.

EXAMPLE 3

Silicon nitride ceramic powder and calcium aluminate binder were mixed together with the appropriate amount of additives i.e. metal silicide and metal oxide to increase the strength and lower the coefficient of friction. The mixture was mixed in a roll-mill for 1 hour. To a ten gram portion of the intimately mixed ceramic powder, approximately 2 grams of water was added. The mixture was stirred until a consistent slurry was obtained, and then poured into a high pressure mold. A pressure of about 6.9 MPa was applied as the mold was heated to about 150° C. After 2 hours the specimen was released from the mold. This procedure and chemical system produced a ceramic structure with self-lubricating properties.

EXAMPLE 4

Alumina ceramic powder and calcium aluminate binder were mixed together with the appropriate amount of additives to increase the strength and lower the coefficient of friction. The mixture was mixed in a roll-mill for 1 hour. To a ten gram portion of the intimately mixed ceramic powder, approximately 2 grams of was added. The mixture, was stirred until a consistent slurry was obtained, and then poured into a high pressure mold. A pressure of 6.9 MPa was applied as the mold was heated to 150° C. After 2 hours the specimen was released from the mold. This procedure and chemical system produced a ceramic structure with self-lubricating properties.

EXAMPLE 5

Zirconium nitride ceramic powder and a cemetitious binder were mixed together with the appropriate amount of additives to increase the strength and lower the coefficient of the friction. The mixture was mixed in a roll-mill for 1 hour. To a ten gram portion of the intimately mixed ceramic powder, approximately 2 grams of water was added. The mixture was stirred until a consistent slurry was obtained, and then poured into a high pressure mold. A pressure of 6.9 MPa was applied as the mold was heated to 150° C. After 2 hours the specimen was released from the mold. This procedure and chemical system produced ceramic structures with self-lubricating properties as shown in FIGS. 1, 1A, 2 and 3.

Figure 1A:
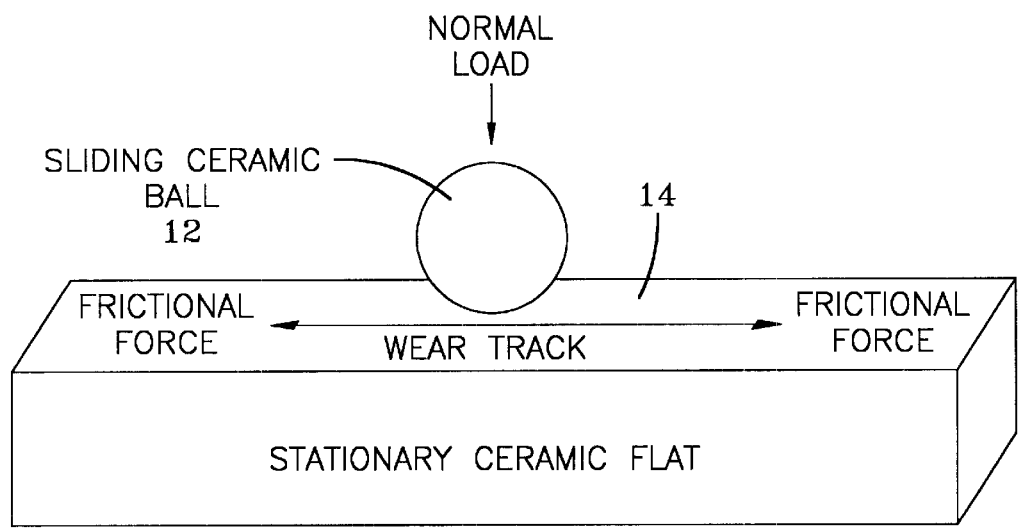

A schematic diagram of the friction and wear test apparatus 10 was employed to study the unique properties of this invention as shown in FIGS. 1 and 1A. The specimens consist of a 12.7 mm diameter ball 12 (monolithic zirconia) which is driven back and forth across a stationary flat surface 14. The stationary flat surface may take on various dimensions. For pressure molded ceramics, a cylindrical specimen having a 25.4 mm diameter and 6.35 mm height, was used. The ball is held in a movable arm 16 driven by an air motor 18. The length of the stroke and the stroke frequency can be varied. For this study the stroke length was 16 mm at a frequency of 45 cycles per minute. This translates to a sliding speed of 24 mm/s. A strain gauge 20 is mounted in the drive linkage to measure the force required to move the ball across the flat surface. Electrical cartridge heaters 22, mounted in the specimen holders, are used to maintain an elevated temperature. A thermocouple 24 situated directly below the center of the flat specimen is used to measure temperature. Normal load is applied as a counter weight to the movable arm 16. The load ranged from 0 to 106N, the maximum capacity of the test apparatus. The system was calibrated using known weights applied to the strain gauge. Knowing the applied load (N) and measured frictional force (F) the friction coefficient (f) can be determined using the following equation.

$$f = F/N$$

In a typical experiment, the load is applied to the ceramic friction couple in increments at one minute intervals at room temperature. The friction force is continually monitored via a recorder attached to the strain gauge 20, and the coefficient of friction is calculated for each load increment, until the maximum load (106N) of the test apparatus is obtained. If the material exhibits a low coefficient of friction, the temperature of the system is then continually raised from room temperature at a rate of approximately 50° C. per minute, until failure occurs as noted by increased frictional force. The load of 106N is maintained throughout the temperature run. The coefficient of friction is then calculated at 25° C. intervals.

Figure 2:
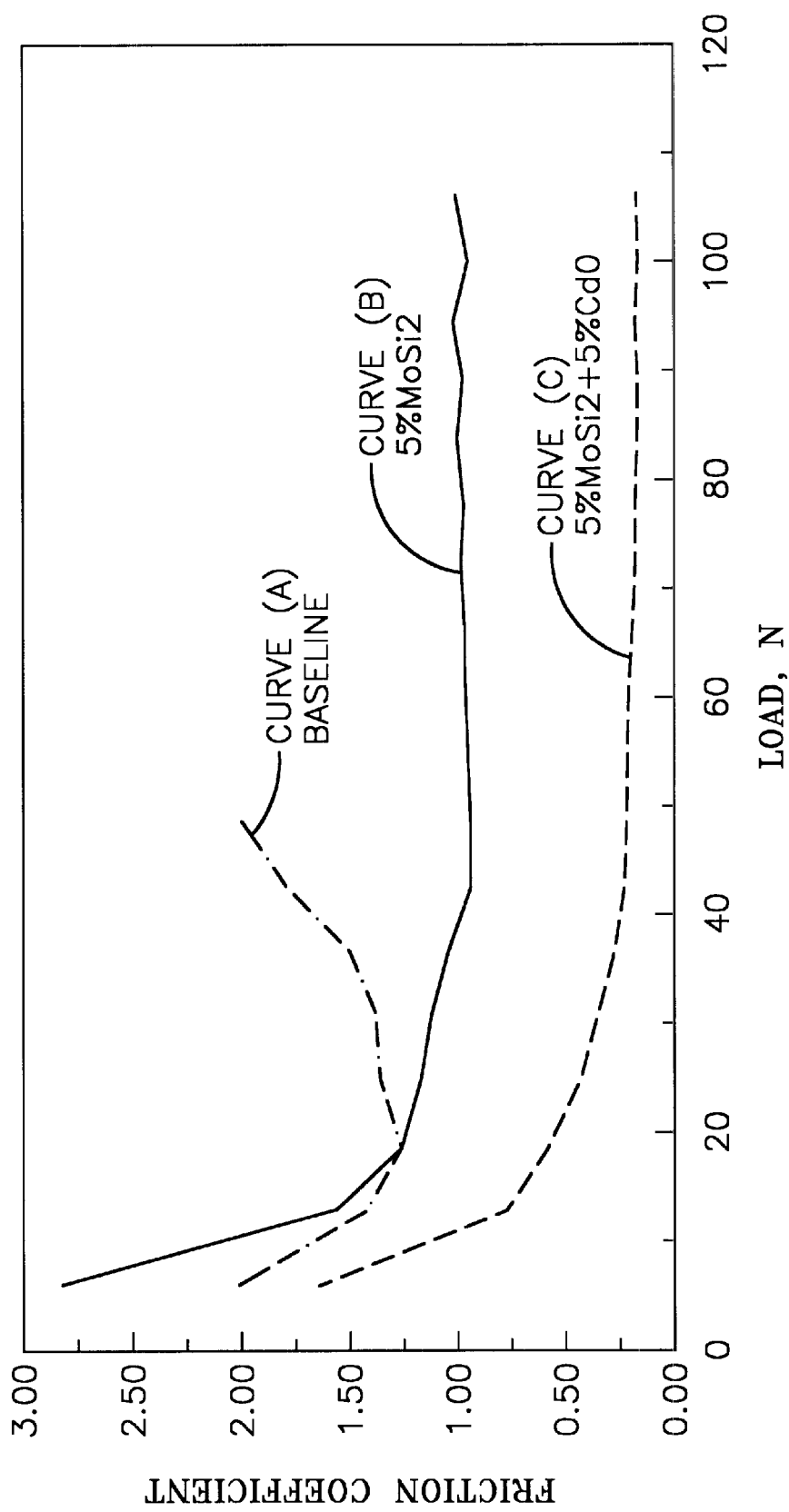
FIG. 2 shows the effect of load on friction at room temperature.

The effect of load on friction at room temperature (23° C.) is shown in FIG. 2. Curve (A) is a friction trace of zirconia and cement binder with no other additives present. Friction is observed to decrease on initial loading but increases rapidly above 20 N. Friction values throughout the load range are high and are considered unacceptable as a lubricating material. The addition of 5% by weight molybdenum disilicide ($MoSi_2$), Curve (B), resulted in a reduction in friction throughout the load range. However the friction was still found to be unacceptable, being approximately 1. On further addition of 5% by weight cadmium oxide (CdO), curve (C), a dramatic reduction in friction to 0.1–0.2 occurred. This was the first reported friction reduction of unlubricated ceramic materials at such high load levels.

Figure 3:
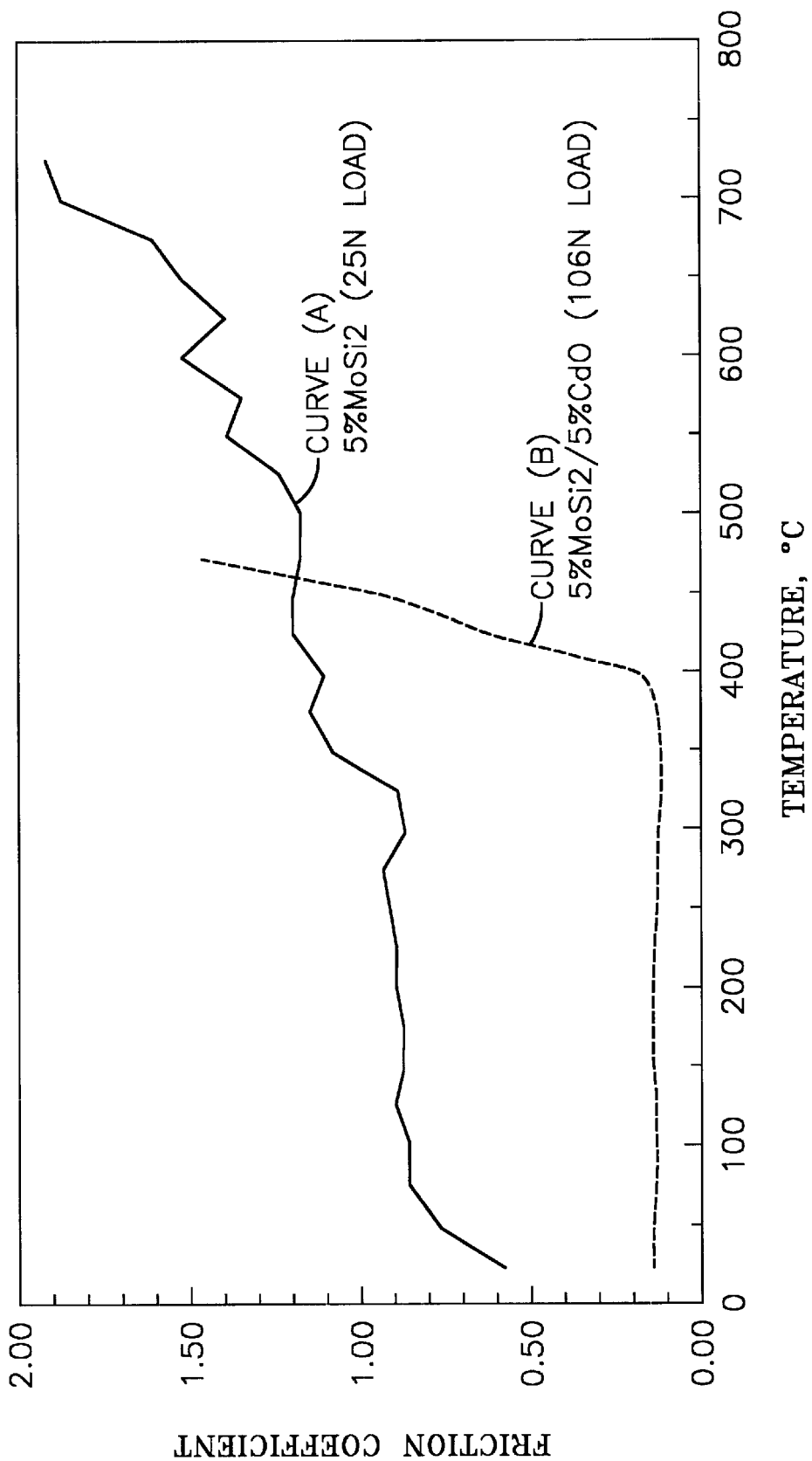
FIG. 3 shows the effect of temperature on friction.

The frictional characteristics of the 5% $MoSi_2$/5% CdO composite was investigated as a function of temperature. After performing the load increment tests, the specimen was heated and the frictional force determined. FIG. 3 shows the effect of temperature on friction. Curve (A) is for the composite containing only 5% by weight $MoSi_2$ at a load of 25N. The friction starts out high and gradually increases with increasing temperature, indicating the poor performance. On the addition of 5% by weight CdO, curve (B), the friction remains low (0.1–0.2) up to temperatures as high as 400° C.

The preferred self-lubricating ceramic composites of this invention have a low porosity of less than 5% by volume, and are derived from ceramic powders having a particle size of less than 5 microns, and a surface area of 10–15 $m^2$/g. The most preferred ceramic powders include zirconia, aluminum oxide ($Al_2O_3$), silicon carbide, and silicon nitride ($Si_3N_4$). Other useful ceramic powders include tungsten carbide, silicon oxide, aluminum nitride, tantalum oxide, titanium nitride, titanium carbide, zirconium nitride, vanadium carbide, titanium boride, zirconium carbonitrate, tin nitride and chromium boride. The ceramic powders are used in the composites in amounts ranging from about 50 to 80 parts by weight and preferably in amounts ranging from about 60 to 70 parts by weight.

The cemetitious binder is used in the ceramic mixture in amounts ranging from about 0.1 to 10 parts by weight, and preferably in amounts ranging from about 1 to 8 parts by weight and include various known cemetitious materials such as hydraulic cement (calcium aluminate), aluminum phosphate, magnesium aluminate, manganese silicate and the like.

The metal silicides can be characterized by $M_xSi_y$, wherein M is a metal and x and y satisfy the stoichiometric requirements. The preferred metal silicides include, for example, molybdenum disilicide, manganese silicide, nickel silicide, tungsten silicide and the like. Metal silicides are added to the ceramic mixture in amounts ranging from about 0.1 to 10 parts by weight and preferably in amounts ranging from 1.0 to 8 parts by weight.

The metal oxides are added to the ceramic mixture in amounts ranging from about 0.5 to 10 parts by weight and preferably in amounts ranging from about 1.0 to 8.0 parts by weight. The preferred metal oxides include cadmium oxide, zinc oxide, antimony trioxide, copper oxide, iron oxide, magnesium oxide, titanium dioxide, manganese oxide, vanadium oxide, silver oxide, silica and the like.

In preparing the mixture of ceramic powders, sufficient amounts of water may be added to form a slurry. The amount of water added ranges from about 0 to 30 parts by weight and preferable in amounts of about 10 to 20 parts by weight of the total composition.

While this invention has been described by a number of specific examples, it is obvious that there are other variation and modifications that can be made without departing from the spirit and scope of the invention as set forth in the appended claims.

What invention claimed:

1. A self-lubricating ceramic composite of low porosity formed from a mixture comprising from about 50 to 80 parts by weight of at least one ceramic powder having a particle size less than five microns, about 0.1 to 10 parts by weight of a cemetitious binder, about 0.1 to 10 parts by weight of a metal silicide, about 0.5 to 10 parts by weight of at least one metal oxide, and from about 0 to 30 parts by weight of water.

2. The self-lubricating ceramic composite of claim 1 wherein the ceramic powder is selected from the group consisting of silicon carbide, silicon nitride, zirconium oxide, zirconium nitride, aluminum oxide, tungsten carbide, and titanium carbide.

3. The self-lubricating ceramic composite of claim 2 wherein the cemetitious binder is calcium aluminate.

4. The self-lubricating ceramic composite of claim 3 wherein the metal silicide is molybdenum disilicide.

5. The self-lubricating ceramic composite of claim 4 wherein the metal oxide is cadmium oxide.

6. The self-lubricating ceramic composite of claim 5 wherein the ceramic powder is zirconium oxide.

7. The self-lubricating ceramic composite of claim 6 wherein the mixture comprises from about 10 to 20 parts by weight of water.

8. The self-lubricating ceramic composite of claim 5 wherein the ceramic powder is silicon carbide.

9. The self-lubricating ceramic composite of claim 5 wherein the ceramic powder is silicon nitride.

10. The self-lubricating ceramic composite of claim 5 wherein the ceramic powder is aluminum oxide.

11. The process of preparing castable ceramic composites of low porosity which comprises forming a ceramic powder mixture by mixing from about 50 to 80 parts by weight of at least one ceramic powder having a particle size less than five microns, about 0.1 to 10 parts by weight of a cemetitious binder, about 0.1 to 10 parts by weight of a metal silicide, about 0.5 to 10 parts by weight of at least one metal oxide, and from about 0 to 30 parts by weight of water and subsequently subjecting the ceramic powder mixture to pressures of about 6.0 to 7.0 MPa at temperatures ranging from about 125° to 175° C. to form self-lubricating ceramic composites capable of maintaining hot-hardness temperatures above 750° C.

12. The process of claim 11 wherein the ceramic powder is selected from the group consisting of silicon carbide, silicon nitride, zirconium oxide, zirconium nitride, aluminum oxide, tungsten carbide, and titanium carbide.

13. The process of claim 11 wherein the cemetitious binder is calcium aluminate.

14. The process of claim 12 wherein the metal silicide is molybdenum disilicide.

15. The process of claim 14 wherein the metal oxide is cadmium oxide.

16. The process of claim 15 wherein the ceramic powder is zirconium oxide.

17. The process of claim 16 wherein the mixture of ceramic powder mixture contains from about 10 to 20 parts by weight of water.

* * * * *